United States Patent
Akrep

(12) 
(10) Patent No.: US 7,032,871 B1
(45) Date of Patent: Apr. 25, 2006

(54) LINEAR ADJUSTMENT DEVICE AND LINEAR ADJUSTMENT SYSTEM INCORPORATING THE DEVICE AND METHOD OF USE

(76) Inventor: Michael J. Akrep, 217 Russell St., P.O. Box 3, Hadley, MA (US) 01036-0003

( * ) Notice: Subject to any disclaimer, the term of this patent is extended or adjusted under 35 U.S.C. 154(b) by 0 days.

(21) Appl. No.: 10/799,303

(22) Filed: Mar. 12, 2004

Related U.S. Application Data

(60) Provisional application No. 60/454,055, filed on Mar. 13, 2003.

(51) Int. Cl.
*A47H 1/10* (2006.01)

(52) U.S. Cl. .................................. 248/323; 248/317

(58) Field of Classification Search ............ 248/298.1, 248/323, 372, 295.11, 297.31, 287.1, 326, 248/317, 214, 324
See application file for complete search history.

(56) References Cited

U.S. PATENT DOCUMENTS

| | | | |
|---|---|---|---|
| 2,020,174 A | 11/1935 | Derossi | |
| 2,703,252 A | 3/1955 | Blackwell | |
| 2,721,757 A | 10/1955 | Anderson | |
| 3,119,499 A | 1/1964 | Tallquist | |
| 3,437,369 A | 4/1969 | Gealy | |
| 3,536,281 A | 10/1970 | Meehan et al. | |
| 3,549,190 A | 12/1970 | Caldwell | |
| 4,114,765 A | 9/1978 | Kojima | |
| 4,289,090 A | 9/1981 | Bagby et al. | |
| 4,355,832 A | 10/1982 | Andersen | |
| 4,685,714 A | 8/1987 | Hoke | |
| 4,826,228 A | 5/1989 | Dinitz et al. | |
| 4,828,076 A * | 5/1989 | Fox | 188/32 |
| 5,219,349 A * | 6/1993 | Krag et al. | 606/53 |
| 5,251,993 A * | 10/1993 | Sigourney | 403/52 |
| 5,746,567 A * | 5/1998 | Herbermann et al. | 414/749.6 |
| 6,042,165 A | 3/2000 | Thompson | |
| 6,102,351 A | 8/2000 | Akrep | |
| 6,105,914 A | 8/2000 | Akrep | |

FOREIGN PATENT DOCUMENTS

DE 249-688 9/1987

OTHER PUBLICATIONS

U.S. Appl. No. 10/425,240, Michael J. Akrep.

* cited by examiner

*Primary Examiner*—A. Joseph Wujciak, III
(74) *Attorney, Agent, or Firm*—Deborah A. Basile

(57) ABSTRACT

Disclosed herein is a linear adjustment device for altering the position of a load comprising, wherein the linear adjustment device comprises a positioning mechanism comprising: a rod; a first pipe slidably engaged with the rod; and a second pipe slidably engaged with the rod. The linear adjustment device further comprises a load sleeve, wherein the load sleeve is secured to the first pipe; and an anchor sleeve, wherein the anchor sleeve is secured to the second pipe. Further disclosed herein is a system incorporating the linear adjustment device disclosed herein, and a method of use.

1 Claim, 4 Drawing Sheets

LINEAR ADJUSTMENT DEVICE AND LINEAR ADJUSTMENT SYSTEM INCORPORATING THE DEVICE AND METHOD OF USE

CROSS REFERENCE TO RELATED APPLICATIONS

This application claims the benefit of U.S. Provisional Application No. 60/454,055 filed on Mar. 13, 2003.

BACKGROUND OF THE INVENTION

1. Field of the Invention

The present invention relates to the mechanics of positioning of a load along the length of a structural member in any industrial or commercial application including in the industry of suspending and focusing loads of any size and weight, such as, for example, audio or video devices in a theater or concert hall.

2. Background of the Invention

There is one dominant method in the current state of the industry in the suspension and focusing of audio and video devices as measured by elevation and azimuth angles. Most commercially available suspension systems are built specifically to suspend and focus one particular model or video or audio device. This results in an inventory of suspension kits and/or parts as numerous as the inventory of audio and video devices. The dominant methodology also does not incorporate into the suspension systems any method of measuring angles. The dominant approach for audio devices is to have kits which allow for crude adjustment of elevation angle, but require a custom frame to be manufactured to set an azimuth, with different frames required for different discrete azimuth settings. The dominant approach for video devices is a kit that allows a minute level of elevation adjustment, with a method of analog control over azimuth.

SUMMARY OF THE INVENTION

The above described problems are eliminated or greatly reduced by a linear adjustment device for altering the position of a load comprising, wherein the linear adjustment device comprises a positioning mechanism comprising: a rod; a first pipe slidably engaged with the rod; and a second pipe slidably engaged with the rod. The linear adjustment device further comprises a load sleeve, wherein the load sleeve is secured to the first pipe; and an anchor sleeve, wherein the anchor sleeve is secured to the second pipe. The problems mentioned above are further eliminated or greatly reduced by a system incorporating the linear adjustment device disclosed herein, and by a method of use.

The linear adjustment device as disclosed herein is capable of repositioning a load anywhere along a plane parallel to a main structural member. Preferably the main structural member is configured to allow a fastening means to secure the linear adjustment device along a plurality of discreet positions located on the main structural member. A positioning mechanism can release a portion of the adjustment device such that the load can be infinitely adjusted along the plane parallel to the main structural member.

DETAILED DESCRIPTION OF THE INVENTION

The linear adjustment device disclosed herein supports a load on a main structural member, and simultaneously allows the load to be repositioned along a plane parallel to the main structural member. The linear adjustment device comprises an anchor sleeve, a load sleeve, and a positioning mechanism. The anchor sleeve serves to secure the linear adjustment device to the main structural member, while the load sleeve and the positioning mechanism allow a user to modify the placement of a load. More specifically, the modification of a load's position is accomplished though the interaction of at least the load sleeve, which physically holds the load, a rod, a first pipe, and securing elements.

The linear adjustment device, the linear adjustment system, and the device's method of use will be further described with reference to the Figures. However, the Figures are in no way limiting, and are used only to provide clarity to the disclosure. Accordingly, obvious modifications and adjustments to the Figures is contemplated herein.

Figure 1:
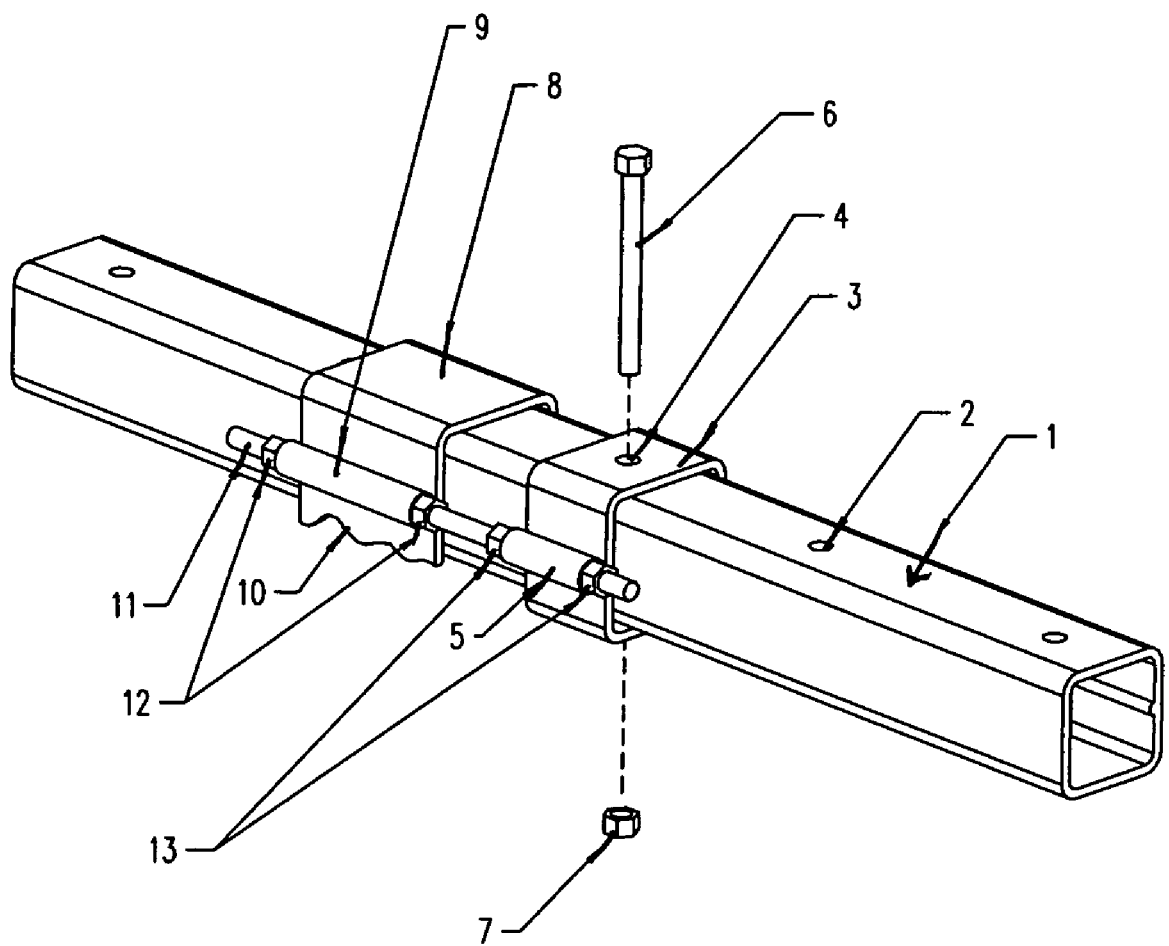
FIG. 1 is an illustration depicting an exemplary linear adjustment system capable of holding a variety of loads.

Referring to FIG. 1, an exemplary linear adjustment system 20 comprises a main structural member 1, wherein main structural member 1 comprises an upper plurality of holes 2 disposed on a top surface of main structural member 1, and a lower plurality of holes (not shown) disposed on a bottom surface of main structural member 1, wherein each hole forming upper plurality 2 is in direct alignment with a hole forming the lower plurality of holes. The number of holes forming both upper and lower plurality of holes may vary widely, wherein the number is preferably governed to allow a load to be positioned and repositioned along a plane parallel to any discrete point on a surface of the main structural member. Additionally, the spacing of the each hole from its neighboring hole may also vary widely, wherein such spacing is preferably based on the desired versatility of a load's position on main structural member 1.

Load adjustment system 20 further comprises a linear adjustment device that is slidably engaged with main structural member 1. In an exemplary embodiment, the linear adjustment device comprises an anchor sleeve 3 secured to main structural member 1 via a fastening means, wherein such fastening means may comprise, for example, a bolt 6 and a nut 7. Bolt 6 may be inserted through a top hole 4 on a top surface of anchor sleeve 3 and through a bottom hole (not shown) on a bottom surface of anchor sleeve 3, wherein top hole 4 is aligned with a hole from upper plurality of holes 2 and the bottom hole of anchor sleeve 3 is aligned with a hole from the lower plurality of holes of main structural member 1. Nut 7 may be used to further fasten anchor sleeve 3 to main structural member 1 by securing nut 7 to bolt 6 as indicated by FIG. 1.

The linear adjustment device further comprises a load sleeve 8, wherein load sleeve 8 comprises a lower portion 10 which may be configured to hold any desired load. Although the top portion of load sleeve 8 is configured to extend over the top surface of main structural member 1 and to extend over both sides of main structural member 1, it is contemplated that the top portion of load sleeve 8 may extend over the bottom surface of main structural member 1. In this latter embodiment, then, the linear adjustment device, of course, would be inverted 180 degrees from what is presently described in FIG. 1.

The linear adjustment device further comprises a positioning mechanism, wherein the positioning mechanism serves to adjust the position of a load. In an exemplary embodiment, positioning mechanism comprises a rod 11 inserted through a pipe 5 and a pipe 9, wherein pipe 5 is secured to anchor sleeve 3, and pipe 9 is secured to load sleeve 8. Although FIG. 1 depicts pipes 5 and 9 as enveloping rod 11, it is contemplated herein that pipes 5 and 9 may be disposed on rod 11 in any manner such that rod 11 is slidably engaged with pipes 5 and 9.

The positioning mechanism further comprises securing elements capable of securing load sleeve 8 onto, and releasing load sleeve 8 from, any one of the discrete positions on main structural member 1. In an exemplary embodiment, the securing elements comprise nuts 12 and nuts 13, wherein nuts 12 releasably secure pipe 9 to rod 11, and wherein nuts 13 releasably secure pipe 5 to rod 11. Preferably rod 11 is threaded such that nuts 12 and nuts 13 can be loosened and tightened around rod 11.

Although FIG. 1 depicts only a single positioning mechanism, it is contemplated herein that linear adjustment system 20 may comprise more than one single positioning mechanism disposed on any of the surfaces of anchor sleeve 3 and anchor sleeve 8. For example, another positioning mechanism may be secured to anchor sleeve 3 and to load sleeve 8 on a side of sleeves 3 and 8 opposite to the sides holding the positioning mechanism depicted in FIG. 1. In the alternative or in addition, another positioning mechanism, for example, may be secured to load sleeve 8 and to anchor sleeve 3 on the same side of sleeves 3 and 8 as is the positioning mechanism depicted in FIG. 1.

Figure 2:
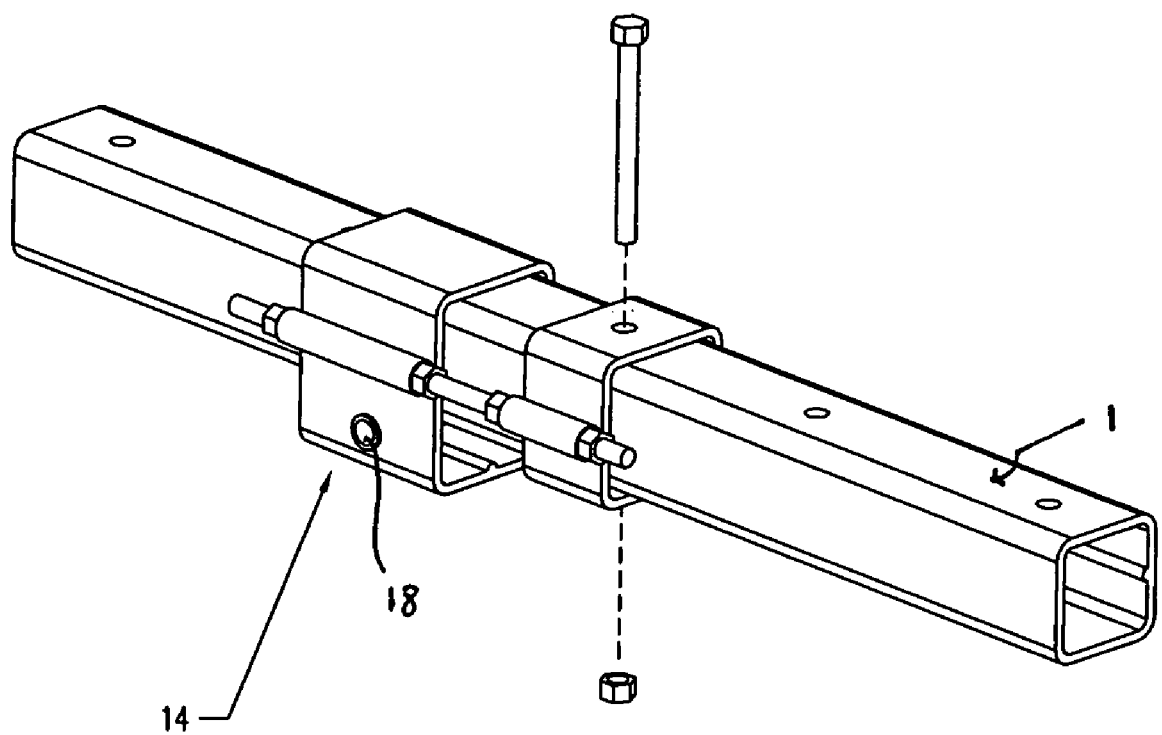
FIG. 2 is an illustration depicting an exemplary linear adjustment system adapted to hold an exemplary class of loads.
Figure 3:
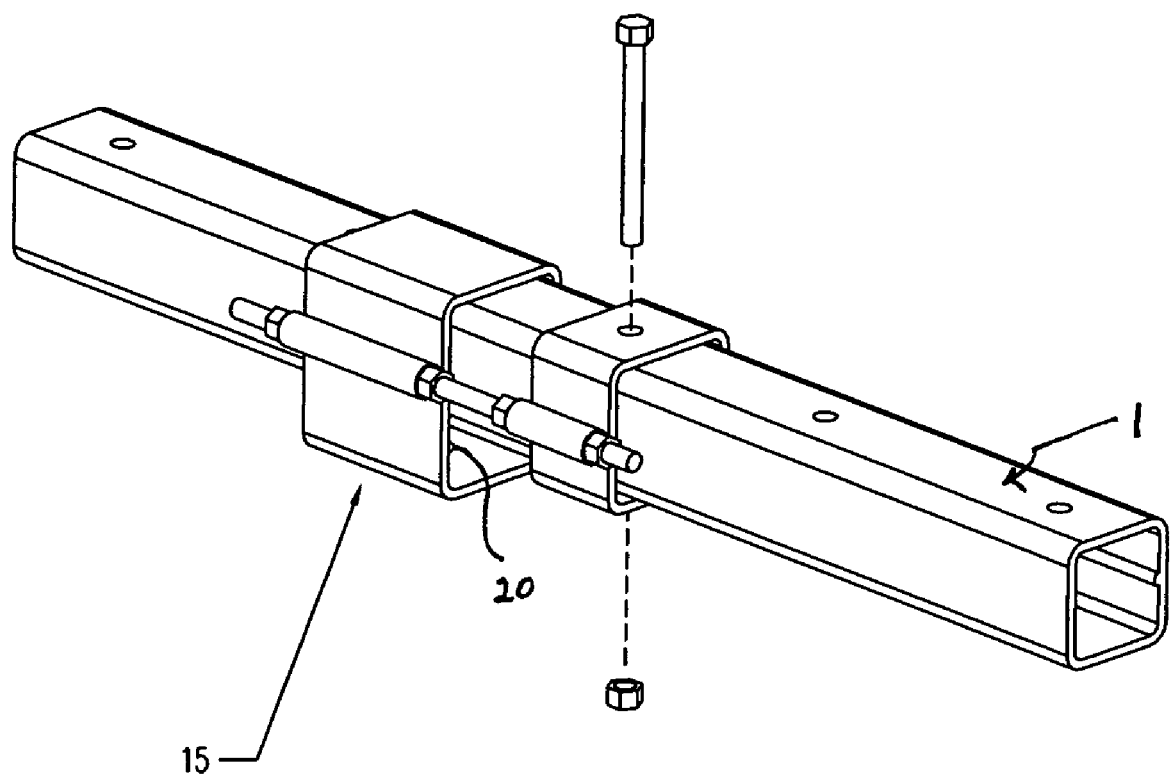
FIG. 3 is an illustration depicting an exemplary linear adjustment system adapted to hold another exemplary class of loads.
Figure 4:
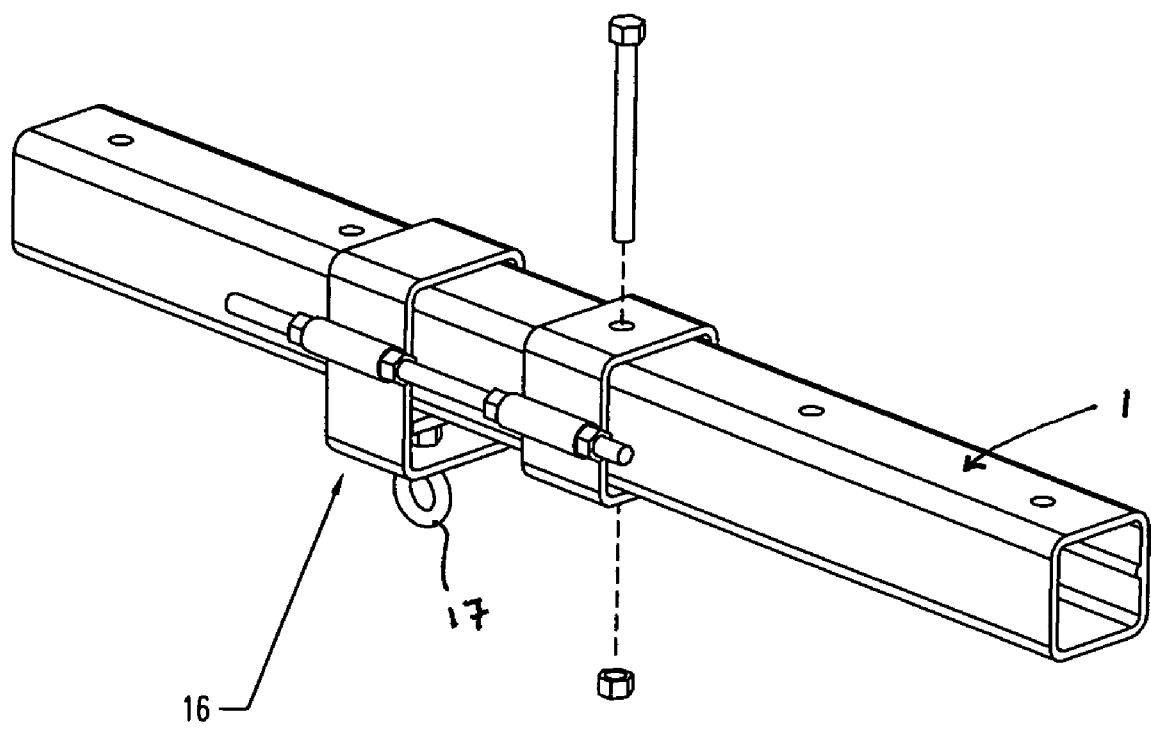
FIG. 4 is an illustration depicting an exemplary linear adjustment system adapted to holder another exemplary class of loads.

The linear adjustment device serves primarily two functions: (1) to securely stabilize a load onto main structural member 1; and (2) when desired, to adjust the position of the load from and to an infinite number of discrete positions along a plane parallel to at least one of the exterior surfaces of main structural member 1. The first objective is principally carried out by anchor sleeve 3 and its fastening means, and by load sleeve 8. That is, anchor sleeve 3 is configured such that fastening means can securely stabilize the linear adjustment device onto main structural member 1. Additionally, load sleeve 8 physically carries the load. As such, load sleeve 8 may be specially configured at lower portion 10 to support a particular class of loads. FIGS. 2–4 illustrate three exemplary configurations of lower portion 10 of a load sleeve.

FIG. 2 depicts an exemplary load sleeve 14, wherein the bottom portion of load sleeve 14 comprises a section that joins the top portion of load sleeve 14 such that load sleeve 14 envelops main structural member 1. Load sleeve 14 further comprises a pipe 18 disposed perpendicularly to the main axis of structural member 1. Pipe 184 may be used to support loads with typical yoke mounting configurations, allowing an axle to pass through pipe 184. The axle may be, and preferably is, a bolt secured by a nut. Load sleeve 14 is particularly well adapted for loads that are required to rotate over a modest angular range about a horizontal axis through pipe 184.

FIG. 3 depicts an exemplary load sleeve 15, wherein the bottom portion of load sleeve 15 comprises a section that joins the top portion of load sleeve 15 such that load sleeve 15 envelops main structural member 1. Load sleeve 15 further comprises a hole 20 in the bottom portion of load sleeve 15. Hole 20 may be used to support loads with typical rotating requirements about a vertical axle through hole 20. The axle may, and preferably is, a bolt secured by a nut. Load sleeve 15 is particularly well adapted for loads that are required to rotate up to a 360-degree angular range about a vertical axis through hole 20.

FIG. 4 depicts an exemplary load sleeve 16, wherein the bottom portion of load sleeve 16 comprises a section that joins the top portion of load sleeve 16 such that load sleeve 16 envelops main structural member 1. Additionally, load sleeve 16 comprises an eye 17 attached to the bottom portion of load sleeve 16. Eye 17 is particularly well suited to loads where a shackle, hook, rope, or other element can be tied off or otherwise attached to eye 17.

The linear adjustment device carries out the second primary objective of the invention, i.e., it allows the position of the load to be adjusted to an infinite number of discrete positions on a plane parallel to main structural member 1, principally by the interaction between the positioning mechanism and load sleeve 8. An exemplary method for altering the position of a load utilizing linear adjustment system 20 comprises loosening the positioning mechanism(s) and moving load sleeve 8 to a desired position on main structural member 1, wherein, as will be understood below, the furthest position at which a load can be placed away from anchor sleeve 3 is governed by the length of rod 11. Once the load is properly positioned, the positioning mechanism(s) may be tightened thereby securing load sleeve 8 into place.

More specifically, a user may first install the linear adjustment device onto main structural member 1 by sliding the linear adjustment device along the surface of main structural member 1 until a desired position for the linear adjustment device is found. In an exemplary embodiment, hole 4 on anchor sleeve 3 is aligned with a hole forming upper plurality of holes 2 on main structural member 1. A fastening means, such as bolt 6 and nut 7, may then be used to secure anchor sleeve 3 onto main structural member 1. A load may then be positioned onto load sleeve 8, wherein the type of load is determined based on the configuration of lower portion 10.

An exemplary means by which the position of the load may be altered comprises loosening the securing elements of the positioning mechanism, sliding the rod along the length of the main structural member, sliding the load sleeve and its respective pipe along the rod 11 until a desired position has been reached, and tightening the securing elements such that the rod, the load sleeve, and the load sleeve's respective pipe are secured in place.

More specifically, an exemplary embodiment for altering the position of a load comprises loosening nuts 12 and 13 such that rod 11 can be slid either towards or away from anchor sleeve 3 depending on where a user desires to place the load. Once the rod has been accurately positioned, load sleeve 8 and pipe 9 are slid to the desired position, wherein the position is within the limits of rod 11. Nuts 12 are then moved along rod 11 until one of nuts 12 abuts a first terminal end of pipe 9 and another one of nuts 12 abuts a second terminal end of pipe 9, whereby such placement of nuts 12 secures load sleeve 8 and pipe 9 onto their new location on main structural member 1 by securing rod 11 into place. Additionally, nuts 13 may be moved along rod 11 until one of nuts 13 abuts a first terminal end of pipe 5 and another one of nuts 13 abuts a second terminal end of pipe 5, whereby such placement of nuts 13 onto rod 11 further secures rod 11 into place. Of course, the method of altering the positioning of a load utilizing the linear adjustment system disclosed herein is exemplary only, and is not limited to this embodiment, and, as such, obvious modifications as to the number of steps, the order of the steps, as well as to the elements used to accomplish altering the position of a load, are contemplated herein.

What is claimed is:

1. A linear adjustment system comprising:
   a main structural member comprising an upper hole disposed on a top layer of the main structural member and a lower hole disposed on a bottom layer of the main structural member;
   a first linear adjustment device secured to the main structural member, wherein the first linear adjustment device comprises:
      a positioning mechanism comprising:
         a rod;
         a first pipe, wherein the first pipe is slidably engaged with the rod; and
         a second pipe, wherein the second pipe is slidably engaged with the rod;
   a load sleeve, wherein the load sleeve is secured to the first pipe and mounted on main structural member; and
   an anchor sleeve, wherein the anchor sleeve is secured to the second pipe and mounted on main structural member, and further wherein the anchor sleeve comprises an upper hole disposed on a top layer of the anchor sleeve and a lower hole disposed on a bottom layer of the anchor sleeve; and
   a fastening means which secures the anchor sleeve to the main structural member, wherein the fastening means comprises a nut and a bolt;
   wherein the upper hole of the anchor sleeve is aligned with the upper hole of the main structural member, the lower hole of the anchor sleeve is aligned with the lower hole of the main structural member, the bolt is disposed through the upper holes of the anchor sleeve and the main structural member and through the lower holes of the anchor sleeve and the main structural member, and the nut envelops the bolt.

* * * * *